(12) United States Patent
Kang et al.

(10) Patent No.: US 12,330,764 B2
(45) Date of Patent: Jun. 17, 2025

(54) UPRIGHT TANK-BASED PROPULSION ASSISTANCE ROTOR SAIL SYSTEM AND VESSEL EQUIPPED WITH SAME

(71) Applicant: Korea Institute of Ocean Science & Technology, Busan (KR)

(72) Inventors: Hee Jin Kang, Gyeryong-si (KR); Jang Pyo Hong, Daejeon (KR)

(73) Assignee: Korea Institute of Ocean Science & Technology, Busan (KR)

( * ) Notice: Subject to any disclaimer, the term of this patent is extended or adjusted under 35 U.S.C. 154(b) by 447 days.

(21) Appl. No.: 17/813,846

(22) Filed: Jul. 20, 2022

(65) Prior Publication Data
US 2023/0373604 A1 Nov. 23, 2023

(30) Foreign Application Priority Data

May 23, 2022 (KR) ........................ 10-2022-0063013

(51) Int. Cl.
*B63H 9/02* (2006.01)
(52) U.S. Cl.
CPC ...................................... *B63H 9/02* (2013.01)
(58) Field of Classification Search
CPC . B63H 9/00; B63H 9/02; B63H 21/17; B63H 2021/003; B63B 17/0027; Y02T 90/40
USPC ........................................................ 393/39.3
See application file for complete search history.

(56) References Cited

U.S. PATENT DOCUMENTS

| 2,596,726 | A | * | 5/1952 | Rydell | B63H 13/00 |
| | | | | | 416/4 |
| 4,602,584 | A | * | 7/1986 | North | F03D 80/70 |
| | | | | | 416/4 |
| 8,746,162 | B2 | * | 6/2014 | Holohan | B63H 9/02 |
| | | | | | 114/102.29 |
| 8,776,705 | B2 | * | 7/2014 | Poulsen | B63H 9/02 |
| | | | | | 114/39.3 |
| 9,027,490 | B2 | * | 5/2015 | Winkler | B63H 9/02 |
| | | | | | 114/39.3 |

(Continued)

FOREIGN PATENT DOCUMENTS

| CN | 207740122 U | 8/2018 |
| JP | 2019-210595 A | 12/2019 |

(Continued)

*Primary Examiner* — Daniel V Venne
(74) *Attorney, Agent, or Firm* — Knobbe, Martens, Olson, & Bear, LLP (57) ABSTRACT

An upright tank-based propulsion assistance rotor sail system is proposed. The system may include an upright tank fixed to a hull of a ship, and a rotor sail in a form of a cylindrical shape having a length and diameter greater than or equal to the upright tank, and installed to surround part or all of an outer circumferential surface of the upright tank. The rotor sail may be rotatably installed while surrounding the upright tank concentrically with the upright tank, and may be movable along a height direction of the outer circumferential surface of the upright tank to maintain a predetermined height. In addition, a vessel equipped with the upright tank-based propulsion assistance rotor sail system is proposed. The fuel tank may be installed to stand upright on the vessel so that the rotor sail is installed to be movable in the vertical direction.

8 Claims, 7 Drawing Sheets

(56) References Cited

U.S. PATENT DOCUMENTS

| | | | | |
|---|---|---|---|---|
| 9,032,890 | B2* | 5/2015 | Winkler | B63H 9/02 |
| | | | | 114/39.3 |
| 9,346,527 | B2* | 5/2016 | Holohan | B63H 9/02 |
| 9,694,889 | B2* | 7/2017 | Holohan | B63H 21/20 |

FOREIGN PATENT DOCUMENTS

| | | |
|---|---|---|
| KR | 10-2011-0097911 A | 8/2011 |
| KR | 10-2014-0024469 A | 2/2014 |
| KR | 10-1488836 B1 | 2/2015 |
| KR | 10-2016-0001388 A | 1/2016 |
| KR | 10-2017-0016696 A | 2/2017 |
| KR | 10-2387017 B1 | 4/2022 |

* cited by examiner

UPRIGHT TANK-BASED PROPULSION ASSISTANCE ROTOR SAIL SYSTEM AND VESSEL EQUIPPED WITH SAME

CROSS REFERENCE TO RELATED APPLICATION

The present application claims priority to Korean Patent Application No. 10-2022-0063013, filed May 23, 2022, the entire contents of which are incorporated herein for all purposes by this reference.

BACKGROUND

The present disclosure relates to a rotor sail system and a vessel equipped with the same intended to respond to international environmental regulations of greenhouse gas emissions from shipping.

SUMMARY

One aspect is a rotor sail system and a vessel equipped with the same, which include the configuration and arrangement of fuel tanks for fuels with low energy storage densities when used as a marine fuel such as hydrogen which requires eight times the volume of marine gas oil (MGO) and four times that of liquefied natural gas (LNG), making it difficult to arrange fuel tanks, and in which rotor sails based on the Magnus effect, a technology used to provide auxiliary propulsion to vessels in order to reduce greenhouse gas emissions from shipping, are installed together with the fuel tanks by utilizing the fuel tank arrangement characteristics.

Another aspect is an upright tank-based propulsion assistance rotor sail system and a vessel equipped with the same, which enable easy arrangement of fuel tanks while securing cargo space by placing upright tanks on a ship where it is difficult to arrange tanks when using conventional carbon-free fuels such as liquefied hydrogen and ammonia or LNG fuel, and in which a rotating cylindrical rotor sail is placed surrounding the vertically installed tank.

Another aspect is an upright tank-based propulsion assistance rotor sail system, the system including: an upright tank fixed to a hull of a ship; and a rotor sail in a form of a cylindrical shape having a length and diameter greater than or equal to the upright tank, and installed to surround part or all of an outer circumferential surface of the upright tank. The rotor sail may be rotatably installed while surrounding the upright tank concentrically with the upright tank, and may be movable along a height direction of the outer circumferential surface of the upright tank to maintain a predetermined height, and at least one pair of the upright tank and the rotor sail may be installed in one ship.

In addition, the upright tank of the upright tank-based propulsion assistance rotor sail system may be configured in any one of an upright fuel tank or an upright carbon dioxide tank, or in a form including both. The upright fuel tank may include: an inner tank in which a breakwater board is installed to store fuel and prevent sloshing of the fuel; and an outer tank formed to have a larger diameter and length than the inner tank and installed concentrically with the inner tank. The outer circumferential surface of the inner tank and an inner circumferential surface of the outer tank may be spaced apart by a predetermined distance to form a vacuum space, and the vacuum space may be optionally filled with an insulating material. The upright carbon dioxide tank may be configured to store carbon dioxide captured from other components of the ship other than the upright tank by pressurizing or liquefying the captured carbon dioxide.

Moreover, in the upright fuel tank of the upright tank-based propulsion assistance rotor sail system, at least one breakwater board may be installed therein to prevent sloshing of liquid fuel. The breakwater board may include: a vertical perforated breakwater board installed throughout the longitudinal direction of the inside of the upright tank; and a horizontal perforated breakwater board installed over an entire cross-sectional area at a predetermined height inside the upright tank.

Another aspect is a vessel equipped with the upright fuel tank-based propulsion assistance rotor sail system, wherein the upright tank may be installed to stand upright on the vessel, so that the rotor sail may be installed to be movable in a vertical direction.

According to an upright fuel tank-based propulsion assistance rotor sail and a vessel equipped with the same, in the case of a ship fueled by hydrogen which requires four times the volume of LNG, or a ship fueled by ammonia which requires twice as much space as LNG, it is possible to arrange fuel tanks more easily than in the case of an LNG-fueled ship, and by arranging a rotating rotor sail to surround the tank to support the propulsion power of a ship, additional energy saving effect and carbon emission reduction effect can be achieved.

Effects of the present disclosure are not limited to the effects mentioned above, and other effects not mentioned will be clearly understood by those skilled in the art from the description of the claims.

BRIEF DESCRIPTION OF THE DRAWINGS

The above and other objectives, features, and other advantages of the present disclosure will be more clearly understood from the following detailed description when taken in conjunction with the accompanying drawings.

DETAILED DESCRIPTION

1. International Regulations of Greenhouse Gas Emissions from Shipping

As the Marine Environment Protection Committee (MEPC) of the International Maritime Organization (IMO) has agreed in 2018 to a draft of new mandatory measures designed to reduce total greenhouse gas (GHG) emissions from shipping by more than 50% by 2050, compared to 2008 levels, there is a need for technology to reduce greenhouse gas emissions by up to 70% or more per unit ship.

Technology and methods for reducing greenhouse gas emissions from shipping include streamlining hull shape, route optimization, use of fore-and-aft trim, and application of energy saving devices (ESD). However, these technology and methods have limitations in responding to regulations of greenhouse gas emissions from shipping since these technology and methods may only reduce carbon emissions by up to 15%.

In the case of ships fueled by LNG, which Korea has a competitive edge in, around 20% of carbon emission reductions may be achieved, yet it is insufficient to respond to regulations.

2. Utilization of Carbon-Free Fuels (Hydrogen and Ammonia) as a Marine Fuel

In order to respond to regulations, it is necessary to use carbon-free fuels such as hydrogen or ammonia. However, a disadvantage with hydrogen or ammonia is that, when using hydrogen or ammonia as a marine fuel, it is more difficult to arrange fuel tanks and secure cargo space than in the case of LNG since hydrogen requires more than four times the volume of LNG and ammonia requires more than twice the space of LNG (see <Table 1>) in terms of fuel tank arrangement to operate the same distance.

TABLE 1

| Division Fuel Type | MGO Coal Fuel | LNG | Bio Gas | Bio Diesel | Methan Carbon Neutral Fuel | Ammonia | Hydrogen |
|---|---|---|---|---|---|---|---|
| Storage Condition | Atmospheric pressure (1) Ordinary temperature | −162° C. | −162° C. | Atmospheric pressure Ordinary temperature | Atmospheric pressure Ordinary temperature | −34° C. or 10 bar | −253° C. |
| Relative Fuel Tank Size | 1 | 2.3 | 2.3 | 1 | 2.3 | 4.1 | 7.6 |
| Relative CAPEX | 1 | ~1.3 | ~1.3 | 1 | ~1.15 | ~1.2 | Very Expensive |
| Fuel Cost & Availability | Cheap and abundant | | Difficulty in sufficient mass production due to raw material supply and demand problems | Difficulty in price prediction due to instability of supply and demand. Food security issue | High CO2 capture cost (When CO2 is captured from the air) | Expensive, but cheap among carbon neutral fuels | Fuel production cost is reasonable, but transportation and storage cost is high |

Accordingly, it is necessary to come up with an alternative to ship loading of a carbon-free fuel that occupies a large volume and to come up with a technological alternative to respond to environmental regulations by minimizing greenhouse gas emissions.

Figure 1:
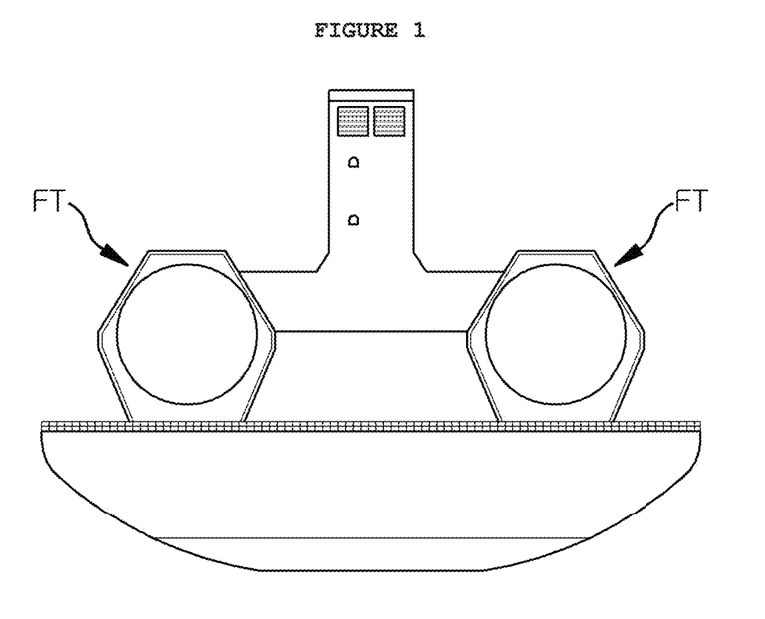
FIG. 1 is a view showing an example of LNG tanks installed at the stern due to insufficient tank arrangement space.

FIG. 1 shows an example of LNG storage tanks installed at the stern due to a lack of tank arrangement space, indicating that it is difficult to deploy hydrogen or ammonia as a marine fuel on conventional ships since hydrogen requires four times the volume of LNG and ammonia requires twice the space of LNG.

Hereinafter, the present disclosure will be described with reference to the accompanying drawings, so that those skilled in the art to which the present disclosure pertains may easily practice the present disclosure.

In describing the embodiments, descriptions of technical contents that are well known in the technical field to which the present disclosure pertains and are not directly related to the present disclosure will be omitted. This is to more clearly convey the gist of the present disclosure without obscuring the gist of the present disclosure by omitting unnecessary description.

For the same reason, some elements are exaggerated, omitted, or schematically illustrated in the accompanying drawings. In addition, the size of each element does not fully reflect the actual size. In each figure, the same or corresponding elements are assigned the same reference numbers.

FIG. 1 is a view showing an example of LNG tanks installed at the stern due to insufficient tank arrangement space. Referring to FIG. 1, it can be seen that two fuel tanks (FT) are installed on the deck of a ship. Of course, the fuel tank (FT) installation example as shown in the drawing is one of the examples. However, this is an example that may clearly show that it is difficult to secure enough space to install the fuel tanks (FT) inside the hull.

Figure 2A:
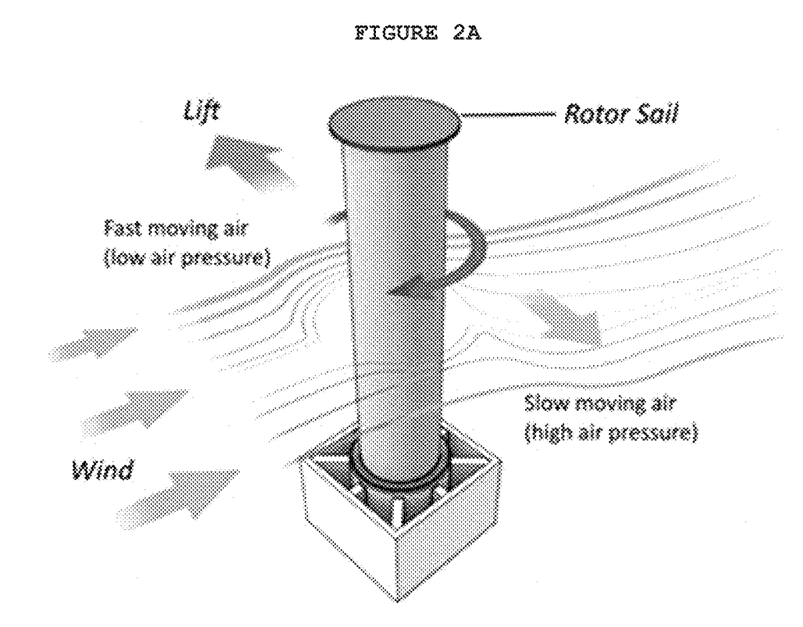
FIGS. 2A and 2B are views showing the operating principle of a rotor sail using the Magnus effect and the concept of a ship equipped with rotor sails, respectively.
Figure 2B:
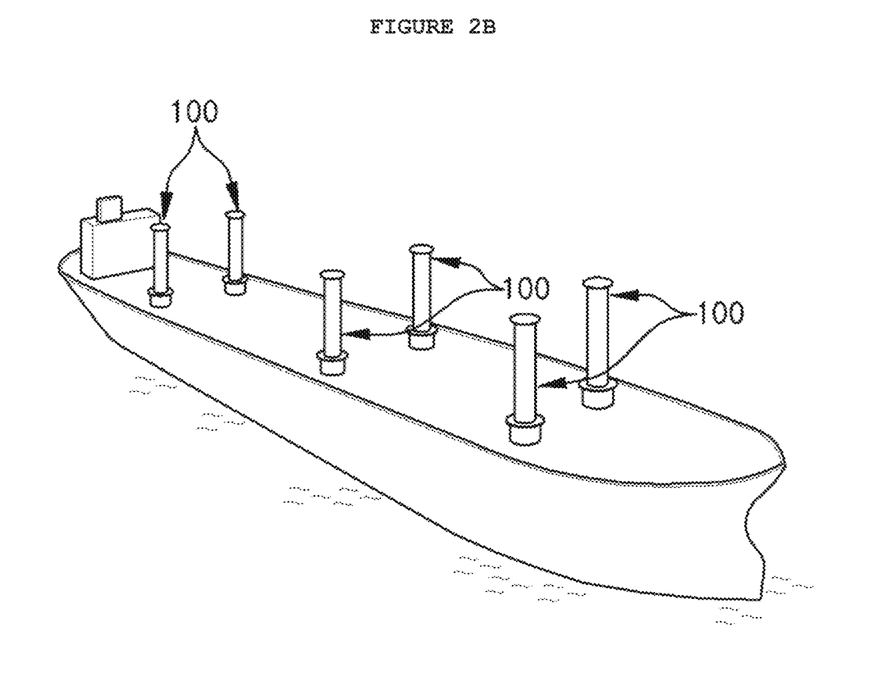

FIGS. 2A and 2B are views showing the operating principle of a rotor sail using the Magnus effect and the concept of a ship equipped with rotor sails, respectively.

Referring to FIG. 2A, when the wind blows around the rotating cylindrical rotor sail, a streamline representing the flow of the surrounding air is drawn, and lift force is created in the direction of the arrow by the surrounding air pressure. This is called the Magnus effect.

FIG. 2B is a view showing the concept of a ship to which a plurality of rotor sails are mounted. It can be seen that a plurality of upright tank-based propulsion assistance rotor sail systems 100 are installed on the deck of the ship. Here, it should be understood that this case in which six upright tank-based propulsion assistance rotor sail systems 100 are installed is only an example, and it is not necessarily limited to installing six upright tank-based propulsion assistance rotor sail systems 100 in one ship.

Figure 3:
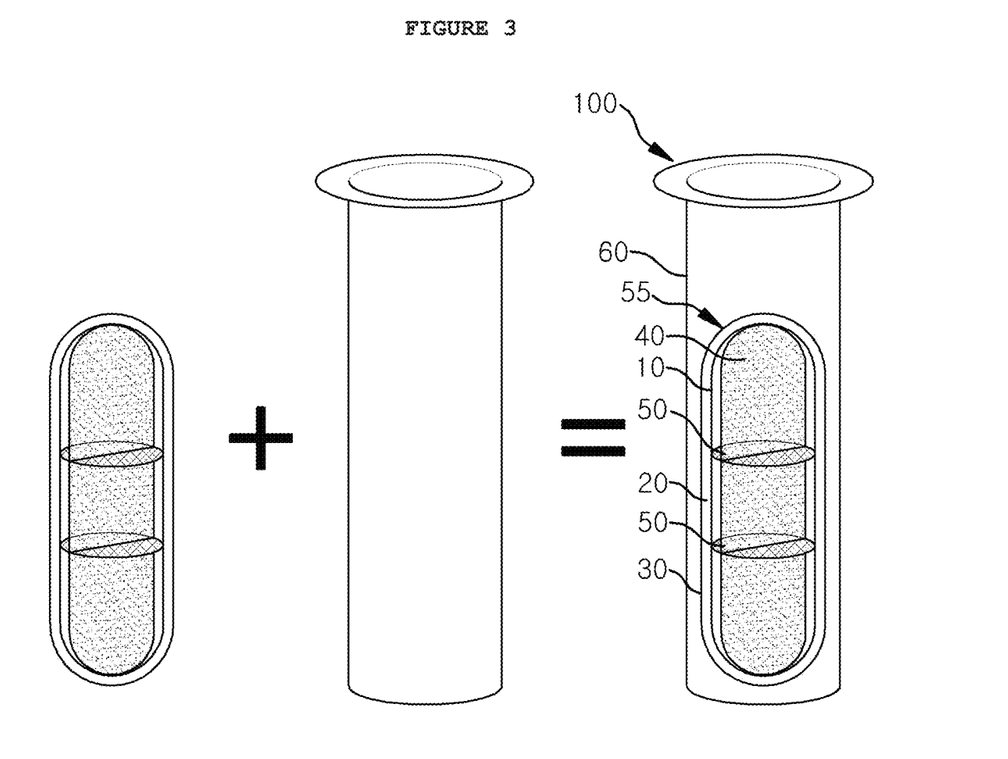
FIG. 3 is a view showing the configuration of an upright tank-based propulsion assistance rotor sail system according to an embodiment of the present disclosure.

FIG. 3 is a view showing the configuration of an upright tank-based propulsion assistance rotor sail according to an embodiment of the present disclosure.

Referring to FIG. 3, the upright tank-based propulsion assistance rotor sail includes: an upright tank fixed to a hull of a ship; and a rotor sail in a form of a cylindrical shape having a length and diameter greater than or equal to the upright tank, and installed to surround part or all of the outer circumferential surface of the upright tank. The rotor sail is rotatably installed while surrounding the upright tank concentrically with the upright tank, and is movable along a height direction of the outer circumferential surface of the upright tank to maintain a predetermined height, and at least one pair of the upright tank and the rotor sail is installed in one ship.

At this time, the upright tank 55 may be configured as any one of an upright fuel tank or an upright carbon dioxide tank, or in a form including both.

At this time, the upright fuel tank includes: an inner tank 10 to store fuel; and an outer tank 30 formed to have a larger diameter and length than the inner tank 10 and installed concentrically with the inner tank 10. The outer circumferential surface of the inner tank 10 and the inner circumferential surface of the outer tank 30 are spaced apart by a predetermined distance to form a vacuum space, and the vacuum space may be optionally filled with an insulating material. The upright carbon dioxide tank is configured to store carbon dioxide captured from other components of the ship other than the upright tank by pressurizing or liquefying the captured carbon dioxide.

In addition, when the upright tank 55 is configured as an upright fuel tank, at least one breakwater board is installed therein to prevent sloshing of liquid fuel. The breakwater board includes: a vertical perforated breakwater board 40 installed throughout the longitudinal direction of the inside of the upright tank 55; and a horizontal perforated breakwater board 50 installed over the entire cross-sectional area at a predetermined height inside the inner tank 10 of the upright tank 55.

As described above, by the vertical perforated breakwater board 40 installed over the entire length in the vertical direction and the horizontal perforated breakwater board 50 installed over the entire cross-sectional area in the left to right direction, it is possible to reduce the sloshing of the liquid fuel stored in the upright tank 55 and the inner tank 10 as much as possible.

When the upright tank-based propulsion assistance rotor sail system 100 as described above is installed on a vessel, the upright tank 55 is installed on the deck of the vessel so as to maintain an upright state while standing upright, and a rotor sail 60 is installed so as to be rotatable based on the upright tank 55 and movable in the vertical direction.

It is also possible to add a carbon dioxide storage tank to the upright tank 55 around which the rotor sail 60 is installed. Here, the carbon dioxide storage tank means a storage tank capable of storing carbon dioxide captured from other components of the ship other than the upright tank 55 by pressurizing or liquefying the captured carbon dioxide.

As described above, in the case of an embodiment in which the upright tank 55 includes a carbon dioxide storage tank, the carbon dioxide storage tank included in the upright tank 55 may be in an upright form extending a predetermined length in the longitudinal direction like the upright tank 55, or may be of a form coupled to the upper end or lower end of the upright fuel tank. That is, an appropriate form may be selected according to the conditions set for each embodiment.

Figure 4:
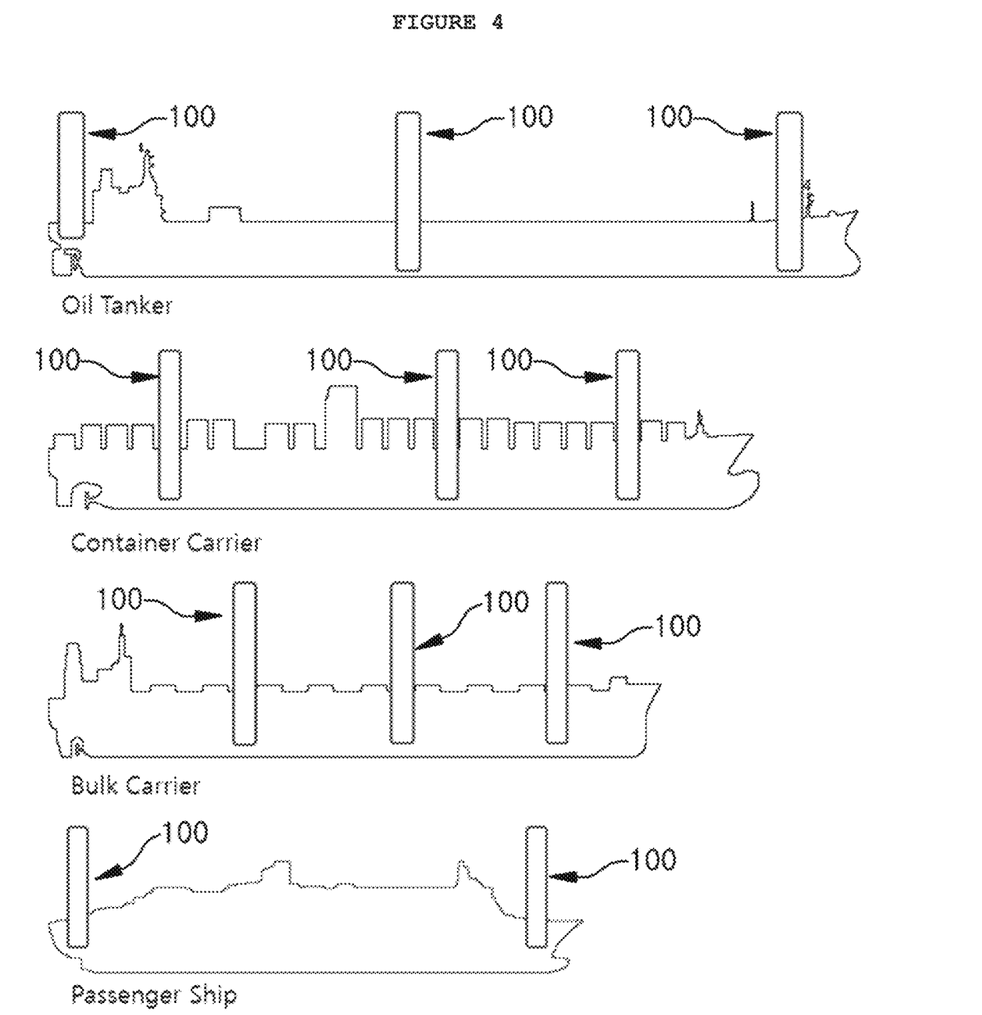
FIG. 4 is a conceptual view showing a case in which upright tank-based propulsion assistance rotor sail systems according to an embodiment of the present disclosure are arranged for each ship type.

FIG. 4 is a conceptual view showing a case in which upright tank-based propulsion assistance rotor sails according to an embodiment of the present disclosure are arranged for each ship type.

Referring to FIG. 4, a side view of the cases in which the upright tank-based propulsion assistance rotor sail systems 100 are installed in an oil tanker, a container carrier, a bulk carrier, and a passenger ship from the top is conceptually illustrated. However, the number of upright tank-based propulsion assistance rotor sail systems 100 installed for each ship type does not necessarily have to be the same as the number shown in the drawing, and it is advisable to install an appropriate number according to the conditions set for each embodiment.

Figure 5:
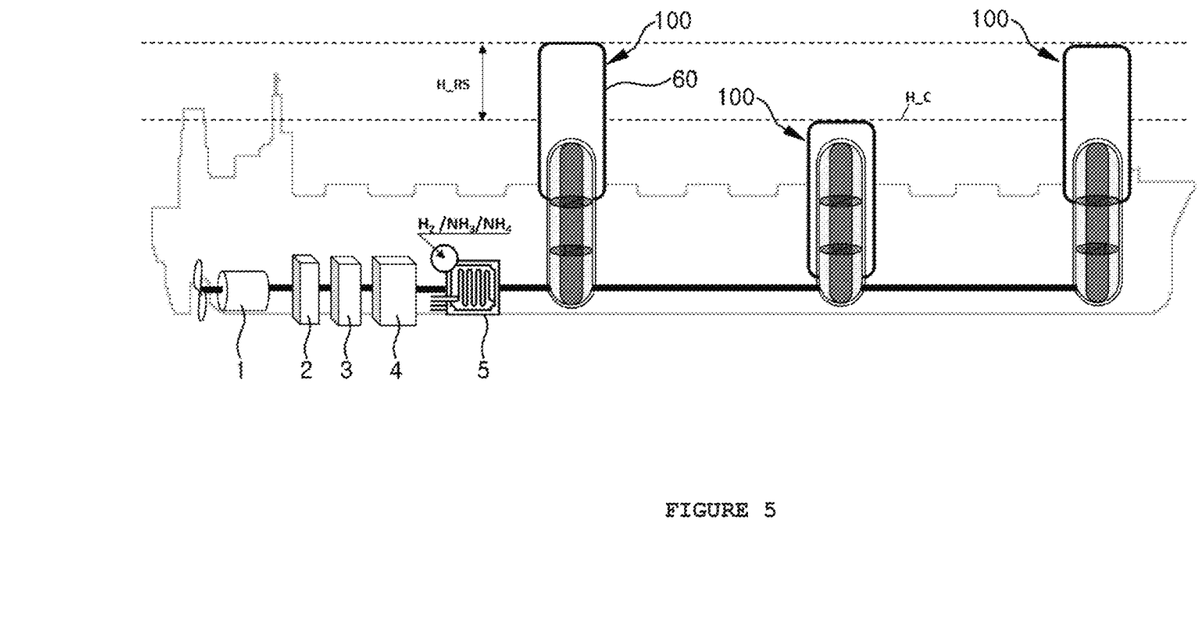
FIG. 5 is an exemplary conceptual view of upright tank-based propulsion assistance rotor sail systems according to an embodiment of the present disclosure placed in a ship equipped with a fuel cell and an electric propulsion system using hydrogen (or ammonia or LNG) as a fuel.

FIG. 5 is an exemplary conceptual view of upright tank-based propulsion assistance rotor sails according to an embodiment of the present disclosure placed in a ship equipped with a fuel cell and an electric propulsion system using hydrogen (or ammonia or LNG) as a fuel.

Referring to FIG. 5, it can be seen that when the rotor sail 60 included in each upright tank-based propulsion assistance rotor sail system 100 is maximally raised, the height to the upper end is expressed as the rotor sail rise height (H_RS), and that when the rotor sail 60 is lowered to completely cover the upright tank 55, the height to the upper end is close to the loading station crane operating height (H_C), which reaches the height at which the loading station crane is operated.

In addition, a propulsion motor 1, a variable frequency drive 2, a transformer 3, a main switchboard 4, and a fuel cell 5 are installed at the stern of the ship.

Figure 6:
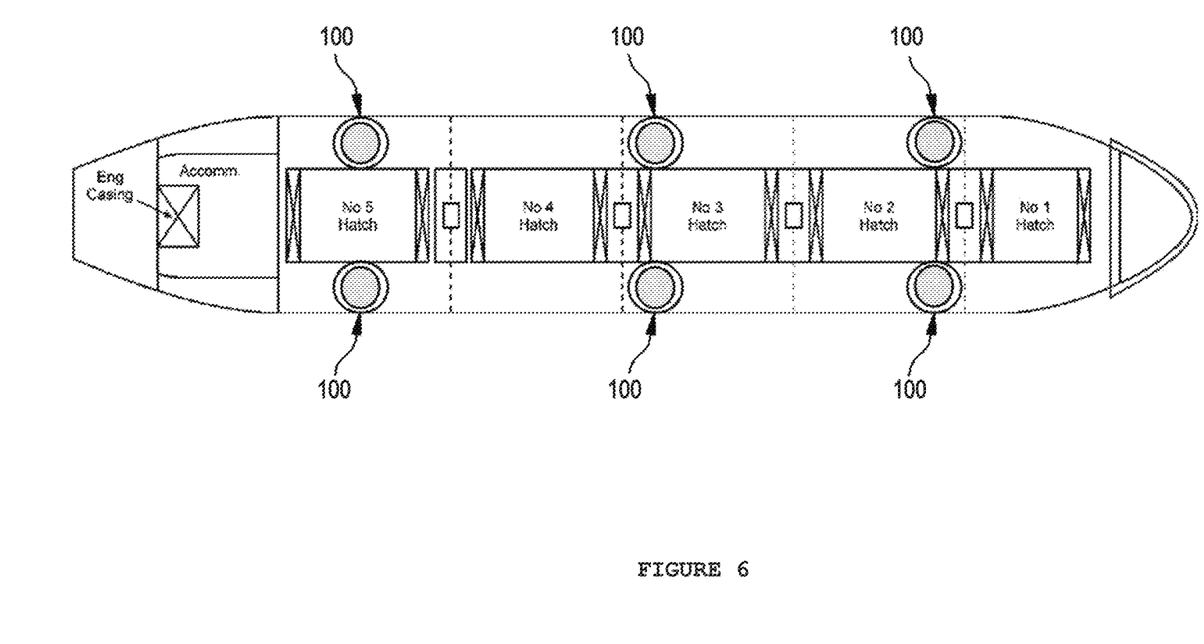
FIG. 6 is a view showing the placing of upright tank-based propulsion assistance rotor sail systems according to an embodiment of the present disclosure in a bulk carrier.

FIG. 6 is a view showing the placing of upright tank-based propulsion assistance rotor sails according to an embodiment of the present disclosure in a bulk carrier.

Referring to FIG. 6, three pairs of upright tank-based propulsion assistance rotor sail systems 100 are installed on the hull of a bulk carrier. Here, the direction of the bow is the bottom of the drawing, and the direction of the stern is the top of the drawing.

In the present specification and drawings, embodiments of the present disclosure have been disclosed, and although specific terms have been used, they are only used in a general sense to easily describe the technical contents of the present disclosure and help the understanding of the present disclosure, and are not intended to limit the scope of the present disclosure. It is apparent to those skilled in the art to which the present disclosure pertains that other modifications based on the technical spirit of the present disclosure may be implemented in addition to the embodiments disclosed herein.

What is claimed is:

1. An upright tank-based propulsion assistance rotor sail system comprising:
   at least one upright tank; and
   a rotatable rotor sail having a cylindrical shape and having a length and diameter greater than or equal to the at least one upright tank, the rotatable rotor sail surrounding at least part of an outer circumferential surface of the at least one upright tank,
   wherein the rotatable rotor sail is concentrically arranged with respect to the at least one upright tank, and is movable along a height direction of the outer circumferential surface of the at least one upright tank to maintain a predetermined height.

2. The upright tank-based propulsion assistance rotor sail system of claim 1, wherein the at least one upright tank is configured in any one of an upright fuel tank, an upright carbon dioxide tank, or in a form including both, and
wherein the upright fuel tank comprises:
an inner tank configured to store fuel, the inner tank comprising a breakwater board therein configured to prevent sloshing of the fuel; and
an outer tank having a larger diameter and length than the inner tank and concentrically arranged with respect to the inner tank.

3. The upright tank-based propulsion assistance rotor sail system of claim 2,
wherein the breakwater board comprises:
a vertically perforated breakwater board disposed along a longitudinal direction of the at least one upright tank; and
a horizontally perforated breakwater board disposed over an entire cross-sectional area at a predetermined height of the at least one upright tank.

4. A vessel comprising the upright tank-based propulsion assistance rotor sail system of claim 1, wherein the at least one upright tank is disposed to stand upright on the vessel, so that the rotatable rotor sail is movable in a vertical direction.

5. A vessel comprising at least one pair of the upright tank-based propulsion assistance rotor sail system of claim 1.

6. The upright tank-based propulsion assistance rotor sail system of claim 2, wherein an outer circumferential surface of the inner tank and an inner circumferential surface of the outer tank are spaced apart by a predetermined distance to form a vacuum space.

7. The upright tank-based propulsion assistance rotor sail system of claim 6, wherein the vacuum space is filled with an insulating material.

8. The upright tank-based propulsion assistance rotor sail system of claim 2, wherein the at least one upright tank is configured as the upright carbon dioxide tank, and wherein the upright carbon dioxide tank is configured to store carbon dioxide captured from other components of a ship other than the at least one upright tank by pressurizing or liquefying the captured carbon dioxide.

* * * * *